Patented July 18, 1944

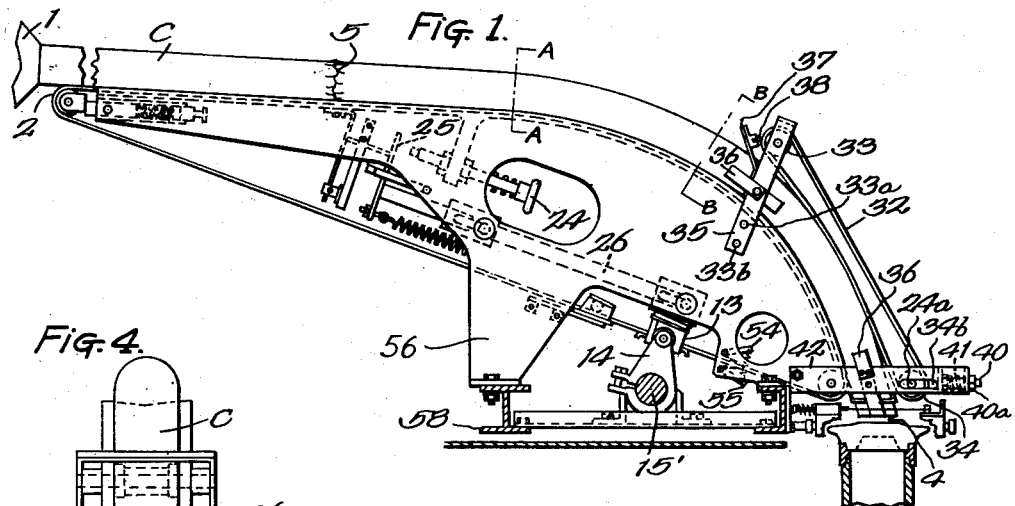
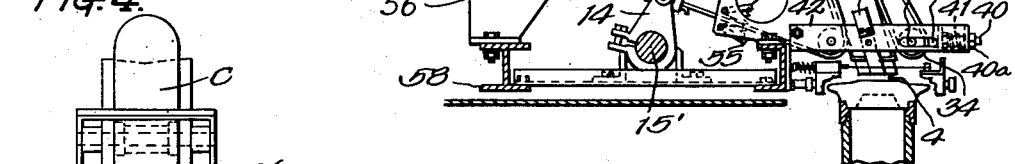
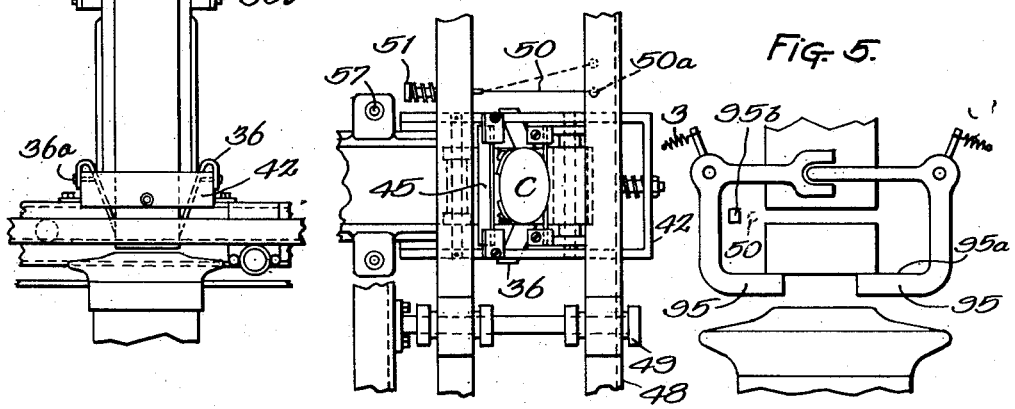
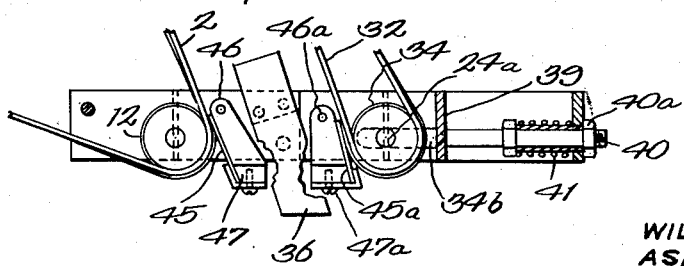
INVENTORS
WILLIAM J. MILLER
ASHLEY J. REEK

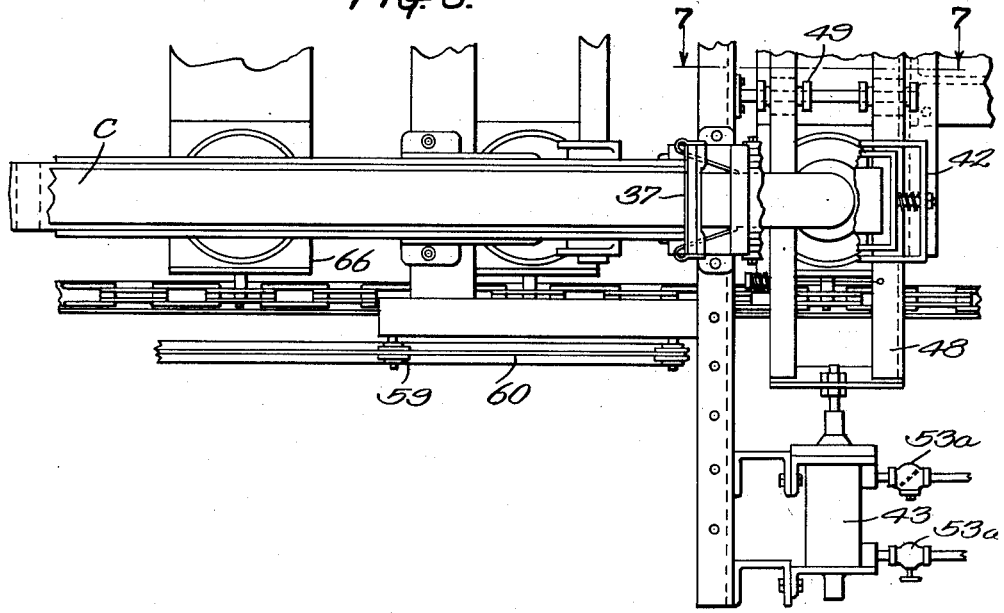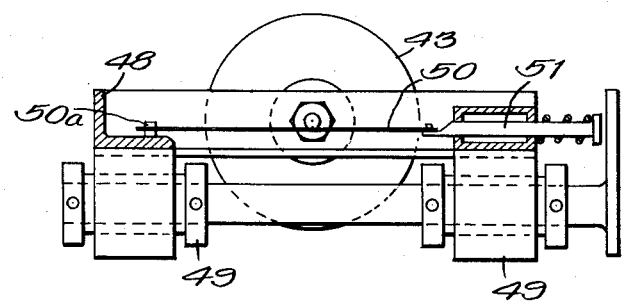

2,354,170

UNITED STATES PATENT OFFICE 2,354,170

APPARATUS AND METHOD FOR CHARGING POTTERY MOLDS

William J. Miller, Swissvale, and Ashley J. Reek, Carrick, Pa.; said Reek assignor to said Miller Original application August 21, 1939, Serial No. 291,158. Divided and this application October 6, 1942, Serial No. 460,946

18 Claims. (Cl. 25—24)

This is a division of our co-pending application Serial No. 291,158, filed August 21, 1939.

The invention has to do with a method of and apparatus for forming and feeding charges of clay to pottery molds from pugged and extruded clay slugs. The objects are to form proportional charges, deposit the same on the center of distribution of the molding surface and then spread the clay over the ware forming surface thereby insuring that the molding surface will be properly covered to a given depth suitable for jiggering and at the same time conserving material.

The present application is principally concerned with certain novel improvements associated with the feeder for guiding and directing clay so that the charge will be properly located on the mold and also in a method of cutting off charges of clay designed to insure proper disposition thereof on the molding surface of the mold.

In the drawings:

Fig. 1 is a side elevation of the feeder.

Fig. 2 is a detail showing apparatus for guiding and directing the lower end of the slug from which charges of clay are cut.

Fig. 3 is a bottom plan view of the ejecting end of the feeder of Fig. 1.

Fig. 4 is a front elevation of the feeder of Fig. 1.

Fig. 5 illustrates mechanism for supporting the charge subsequent to segregation and before said charge is deposited upon the mold.

Fig. 6 is a top plan view of Fig. 1.

Fig. 7 is a vertical section taken on line 7—7 of Fig. 6.

The clay or ceramic material from which the charges are made issues from the nozzle of an extrusion machine 1 in a column C of predetermined and preferably circular cross section containing a multiple of mold charges. The column may be fed directly onto the belt 2 of the feeder and transported in uninterrupted length to the mold charging position 4, providing the rate of extrusion is uniform and equal to the rate of linear consumption, or the column may be segregated at the mouth of the extrusion machine in billets or slugs of predetermined length and manually deposited on the belt 2, the lengths of material being welded together as at 5 by hand. A single extrusion machine may be used in this event with a multiple of feeders.

From the line A—A rearwardly, or to the left, in Fig. 1 is the loading zone where clay is applied and the belt preferably travels therealong at an incline or along a line which is a projection of the angle of interruption of curvature at A—A so as to avoid any sharp bend. The angle of interruption may be predominately horizontal, as illustrated, or predominately vertical. Where the plane of the loading surface is predominately vertical, the weight of the clay will assist the drive in overcoming friction drag between the conveyor belt and its supporting surface and thus facilitate the forward travel thereof.

The lower return portion of the belt travels in a straight line and is driven in this zone by a shiftable clutch 13, intermittently actuated by rocker arm 14 adjustably clamped on shaft 15'.

The volume of material contained in the charge is regulated by an adjustable screw 24. The screw controls the limit of travel of the clutch 13 to the right, Fig. 1 (and hence the point of commencement of the belt advancing stroke), through engagement with a stop member 25, fastened to the rear end of the frame 26 on which the clutch is mounted.

In the zone of curvature, commencing at or about the line B—B, the clay column C is preferably engaged and supported on the upper side by a belt 32, which travels between crowned rollers 33 and 34. This belt helps support the column in the downward path to the segregating position and prevents it from raising off the lower belt and buckling.

The degree of pressure exerted will depend on how easily the column will bend and how tightly it must be pressed between the belts to prevent slipping, such factors as normal adhesion being taken into consideration. It is desired, however, not to press the column so hard as to cause deformation in any harmful degree.

In order to adjust the belt to columns of different dimension, and also to tension it, the upper roller 33 is mounted in a frame 35 adjustably attached to the feeder frame by studs 33a and 33b so that it may be raised and lowered and swung in an arc.

The lower roller 34 is adjustable toward and away from belt 2 and it may also float so as to relieve any excess back pressure on the column. Sometimes the welds 5 are oversize and it is better to have the belt yield than to distort the column. The roller shaft 24a is located in slots 34b in the outer frame 42 and has a yoke 39 attached thereto inside the frame. This yoke is adjustable back and forth by means of screw 40 and nut 40a and a spring 41 encompassing the screw and bearing against the inside of the frame allows the entire yoke 39 and roller 34 to float rearwardly.

The clay column is guided and supported laterally by flexible strips of metal 36, Fig. 4, attached to roller frames 35 and 42. The extremities thereof are turned outwardly so as to prevent gouging and they are adjustable inwardly by screws 36a.

Blades 45 and 45a, Fig. 2, are provided for detaching the column of clay from belts 2 and 32 and together with lower guides 36 support the column directly above the segregating position. Support at this point is desirable in order to provide the necessary stabilization and resistance to cutting and also to prevent the segregating wire from dragging the end of the column off center. Should the weld between columns be defective, these blades together with the guides 36 will prevent detached ends from dropping onto the mold.

The blades 45 and 45a are mounted in holders 46 and secured thereto by blocks 47 which are tightened by screws 47a. Where the loading zone is horizontal or substantially so, the weight of the portion of the column occupying this zone is either not imposed on blades 45 and 45a and lower guides 36 at all or is only slightly imposed, depending on the degree of inclination. The holders for blade 45 are pivotally mounted at 46a on each side of the frame 42 so that the angle of the blade relative to belt 2 may be adjusted. The holders for blade 45a are mounted on and are shiftable with yoke 39 (see Fig. 3). It is desired that the leading edge of each blade engage each respective belt along the crown of rollers 12 and 34 or slightly thereabove. It will be noted that in passing over the crown of the rollers the lateral curvature of each belt is reversed, thereby tending to draw each belt away from the column of clay along the lateral edges, thereby assisting in stripping the belts from the column, the blades completing the work. It is also desired that the pivots 46a be so positioned that the blades may be swung about a center defined by the point of contact of each blade with its respective belt.

Means are provided for cleaning each belt of residual clay to prevent drying out of the material and surface contamination of the column and also to prevent fouling of the clutch for actuating belt 2. Each cleaner comprises a blade 38 and a holder therefor, there being a collecting pocket for the scrapings. One of these devices is mounted on the frame 35 on flexible supporting members 37 and a pair thereof designated 54 and 55 are disposed directly ahead of the clutch 13, Fig. 1, and on opposite sides thereof. These last two cleaners are pressed against the belt by coil springs.

The base 56, Fig. 1, of the feeder frame has oversize screw holes 57 Fig. 3 to enable lateral and longitudinal adjustment thereof relative to support angles 58 of a support carriage. This permits adjustment of the position of the end face of the clay column relative to the vertical axis of the mold. The angles 58 are connected by cross channels forming a frame which is mounted on grooved wheels 59, Fig. 6, running on tracks 60 so that the entire feeder may be moved back to provide access to dies, chucks, and segregating means. Indexing pins lock the frame one or more forward operating positions.

The mechanism for segregating the charges comprises a frame 48 made up of spaced parallel bars reciprocably mounted on rollers 49. One or more cutting wires 50 are held between the bars, one end of the wire being attached to a stationary binding post 50a, Fig. 7, and the other end to a quick change tensioning device comprising a spring pressed push rod 51 with a hooked terminus for the looped end of the wire. The frame reciprocates once to every two reciprocations of the clutch 13, thereby cutting a charge in each direction. The frame is actuated by an air motor 43 through an adjustable timed valve (not shown) in synchronism with the pottery making functions of machine. Check and adjustable by-pass valves 53a enable the cutting speed to be regulated while the driving connection subsists.

The slug of clay is loaded onto the feeder belt from a horizontal position and is carried by the belt around the curve and downwardly to a segregating point where the lower end of the column faces the mold in substantial parallelism with the molding surface. The column at the segregating position is projected at an angle in order to help produce a proportional charge and the clay is cut off by passing the wire therethrough in a direction crosswise of the long axis of the column at the segregating position. The wire preferably travels in a horizontal plane as indicated by the drawings.

It is desired to obtain a charge of clay so proportioned and of such volume that when deposited on the center of distribution of the mold, it will flow evenly under the press and reliably fill all exposed portions of the molding surface. In this connection, the lowermost end of the column should be positioned so that the vertical center line of the mold and the charge correspond. In other words, they should be co-axial and since the molding surface is usually circular in shape and since the charge is a proportional shape, then it follows that if the charge is placed on the center of distribution of the mold and is pressed out by means of a die similar to that shown in the parent application, then there will be a proper distribution of the material over the molding surface.

The provisions for adjusting the position of the lead end of the slug are responsible for properly locating said end so that the charge, when cut off, will be centered on the mold.

As stated in the parent application it is preferred herein, in the feeding of charges of clay to flat ware molds, to commence the application before the charge has been severed entirely from the parent slug and to progressively lay the charge on the mold. It will be observed that the charge of clay is of smaller diameter than the diameter of the molding surface and the provisions for guiding and locating the end of the slug have the important function of predetermining the location of this slice on the surface of the mold inside the outer limits of the molding surface.

Once the rim of the charge contacts the mold, it adheres thereto and the remainder falls reliably into predetermined position and, furthermore, such adhesion helps in stabilizing the column and resisting the tendency of the cutting wire to drag the column off center. Progressive contact with mold expels air, thus allowing the clay to intimately contact the mold surface and make a good capillary bond. By cutting on the reverse stroke, the danger of dragging the column to one side from repeated cutting in one direction is eliminated.

In order to make the charges fall flat without turning over or striking on the rim, the cutting wire 50 is actuated at high velocity; this may be accomplished by proper regulation of the air motor or by other suitable means. The charge may also be caused to drop flat against the mold by means of the apparatus shown in Fig. 5 which comprises a pair of interconnected swinging brackets 95 having a charge receiving surface 95a disposed directly below the end face of the column of clay. After the wire has passed through the clay and the charge has fallen onto the seat, the wire, or a bar 95b travelling there-ahead of strikes one of the brackets, pushing it outwardly and causing it to open thereby dropping the charge into the mold. The brackets are suspended from the frame 42, Fig. 2, and may be closed by gravity or by a spring 3. The clearance between the center edge of the brackets can be large so that the charge will sag in the central portion and when released will contact the mold first in this zone thereby pushing out the air as the brim zone settles.

With reference to Fig. 1, which the belt 32 is shown as an idler, it is to be understood that it may be driven in synchronism with belt 2 by running a chain between the shafts on which rollers 12 and 33 are mounted. Moreover, various degrees of resistance to travel may be imposed on belt 32 by applying an adjustable friction drag to roller 33 or the shaft on which it is mounted. It is understood that other means may be substituted for belt 32 such as a continuous guide strip bent to the curvature of the clay column and anchored at each end or, in case the clay is sufficiently adhesive and will follow the curve without separating from belt 2, it may not be necessary to apply support along the outer curvature.

In regard to Fig. 3 and the segregating wire 50, it is understood that this wire may operate from various angular positions as shown in dotted line. By experimentation, the best angle for any particular size and consistency of clay may be found. The less there is concentration of force on the column of clay in cutting off the charge, the less opportunity for dragging the column off center.

We claim:

1. In the manufacture of pottery ware on molds the method which consists in forming a column of clay, advancing the column toward a point of charge segregation endwise and along a path having a downwardly curving portion, the end of the column facing the mold at the segregating position, and then segregating said column of clay crosswise of the long axis with such rapidity that the slice thus segregated falls in a substantially horizontal plane with the surface of the mold.

2. In the manufacture of pottery ware on molds, the method which comprises feeding a slug of clay downwardly in endwise fashion with the lower end of the slug in registry with the molding surface of a mold and horizontally cutting a slice of clay from the lower end of the slug with such speed that the slice falls to the surface of the mold in a level substantially horizontal position.

3. In the manufacture of pottery ware on molds, the method which comprises, feeding a slug of clay in endwise fashion downwardly toward the molding surface of a mold with the axis of the mold and the slug in alignment and depositing a slice of clay segregated from the column in centered position on the mold by cutting through the slug with such speed that the slice falls therefrom in level horizontal position to the surface of the mold along the axis.

4. In apparatus for charging pottery molds with clay, means for feeding a slug of clay downwardly in endwise fashion toward a segregating position, a mold and support therefore disposed below the end of the slug and in axial alignment therewith, a substantially horizontal cut off wire, means for moving the wire horizontally through the projecting end of the slug to cut a disc therefrom and deposit it on said mold and means operable to produce rapid motion of the last named means so as to cut off the slice with such speed that the slice will fall in substantially level horizontal position from the end of the slug to the surface of the mold.

5. The combination with means for feeding a slug of clay in endwise fashion downwardly, a mold deposited below and in alignment with the lower end of the slug, a substantially horizontal cut-off wire, fluid actuated means for moving the wire horizontally through the lower end of the slug to cut a disc therefrom and deposit it on the mold and control means for said fluid operated means operable to move the wire at such speed through the end of the slug that the disc cut therefrom will fall to the surface of the mold in substantially level horizontal position.

6. The combination with means for feeding a slug of clay in endwise fashion downwardly, a mold deposited therebelow and in registery with the lower end of a slug, a substantially horizontal cut-off wire and fluid operated means for moving the wire laterally through the end of the slug to cut a disc therefrom with such speed that the disc falls to the surface of the mold in substantially level horizontal position.

7. The method of centering discs of clay on the molding surface of pottery molds wherein the discs are smaller in diameter than the molding surface of the molds which comprises feeding a slug of clay in endwise fashion downwardly toward the molding surface of a mold in registry with the end of the slug, horizontally cutting across the column to cut a disc therefrom, supporting the severed discs in a level horizontal position above the molding surface in line with the slug and mold and then withdrawing support from such slice in a manner to cause the slice to fall from the point of support to the receiving surface of the mold in a level horizontal position.

8. The method of centering discs of clay on the molding surface of pottery molds wherein the discs are smaller in diameter than the molding surface of the molds which comprises, feeding a slug of clay downwardly in endwise fashion toward the molding surface of a mold, the axis of the mold and slug being in alignment, cutting across the slug to cut a disc therefrom depositing the disc on a surface co-axial with the slug and mold which supports the disc in level horizontal position in alignment with the place where it is to be deposited on the mold and then withdrawing support from the disc in such fashion that it falls in level horizontal position to center position on the mold.

9. The combination with means for feeding a slug of plastic material downwardly in endwise fashion, a mold deposited below the end of the slug in axial alignment therewith, a substantially horizontal cut-off wire, means for moving the wire laterally through the lower end of the slug to cut a disc therefrom, means for receiving the disc disposed below the end of the slug and above the mold and in axial alignment therewith and means for actuating the receiver so as to release the slice of clay therefrom in a level horizontal position and deposit it on the mold therebelow.

10. The combination with means for feeding a slug of plastic material downwardly, a substantially horizontal cut-off wire, means for moving the wire laterally through the lower end of the slug to cut a disc therefrom, a mold disposed below and in alignment with the slug for receiving the disc and means intermediate the end of the slug and the mold on which the slice is dropped when cut off arranged to be actuated by the means for moving the wire laterally through the slug for releasing the slice and causing it to drop in a level horizontal position to the surface of the mold.

11. In combination, means for feeding a slug of plastic material downwardly, a mold disposed therebelow in axial alignment therewith, a movable charge positioning device for receiving charges of clay cut off from said slug located between the lower end of the slug and the mold, a substantially horizontal cut-off wire and means for moving the wire laterally through the lower end of the slug to cut a disc therefrom arranged to actuate such positioner to release a charge of clay to a mold therebelow.

12. In combination means for moving a slug of plastic material downwardly, a substantially horizontal cut-off wire, means for moving the wire laterally through the lower end of the slug to cut a disc therefrom and deposit the same on a mold therebelow and means for supporting and guiding the lower end of the slug comprising a plurality of independently adjustable guide surfaces engageable with the end of the slug whereby the end face of the slug is centered on the mold.

13. Apparatus for positioning the lower end of a slug of clay relative to the axis of a mold so that slices of clay cut off from the slug will be deposited in centered position on the mold which comprises, means forming a throat through which the slug is ejected and means for varying the size of the throat to accommodate slugs of different size.

14. In combination, apparatus for positioning the lower end of a slug of clay relative to the axis of a mold so that slices of clay cut off from the slug will be deposited in centered position on the mold which comprises, a support, means forming a throat through which the slug is ejected carried by said support, adjustable means for varying the location of the throat on the support and a horizontally movable cut-off wire for intermittently segregating charges of clay from the lead end of said slug projecting below said throat.

15. Apparatus for positioning the lower end of a slug of clay relative to the axis of a mold so that slices of clay cut off from the clay will be deposited in centered position on the mold comprising a support having a plurality of guide means associated therewith forming a throat through which the clay is ejected and means for varying the positional relation of said guide means with respect to one another.

16. In combination, apparatus for supporting and positioning the lowermost end of a slug of clay relative to the axis of a mold so that slices of clay cut off from the slug will be deposited in centered position on the mold comprising a conductor for feeding the slug of clay downwardly, means embracing the lower end of the slug and forming a throat through which the clay is ejected mounted for adjustment relative to said conductor a horizontal cut off wire disposed below the lead end of the slug and means for moving said wire to cut off charges of clay therefrom.

17. In combination, means for feeding a slug of clay downwardly, a mold, a cut off wire and means for moving the wire to cut-off slices of clay from the slug and a hollow chuck for supporting the mold arranged to permit the passage of slices of clay therethrough to a point of deposit if there is not a mold in the chuck at the time the slice is cut off.

18. The combination with means for feeding a slug of plastic material downwardly, a mold therebelow in register therewith a substantially horizontal cut off wire, means for moving the wire laterally through the slug to cut off a disc and deposit it on the mold, a support for the mold forming with an opening all the way through in vertical registry with the end face of the slug through which surplus slices of clay may drop when there is no mold in the chuck at the time the slice is cut off.

WILLIAM J. MILLER.
ASHLEY J. REEK.